United States Patent [19]

Peltz

[11] 4,157,044
[45] Jun. 5, 1979

[54] FIVE SPEED MOTORCYCLE TRANSMISSION

[76] Inventor: Johnny W. Peltz, 7491 Newton Way, Westminster, Colo. 80300

[21] Appl. No.: 806,187

[22] Filed: Jun. 13, 1977

[51] Int. Cl.² ............................................. F16H 3/08
[52] U.S. Cl. ................................................... 74/356
[58] Field of Search ................. 74/356, 357, 359, 360, 74/358; 192/67 R, 108

[56] References Cited

U.S. PATENT DOCUMENTS

| 2,529,492 | 11/1950 | Gilbert | 192/67 |
| 3,115,047 | 12/1963 | Lunn et al. | 74/360 |
| 3,600,963 | 8/1971 | Portman | 74/360 |

Primary Examiner—Benjamin W. Wyche
Assistant Examiner—Frank H. McKenzie, Jr.
Attorney, Agent, or Firm—Bruce G. Klaas; Dennis K. Shelton

[57] ABSTRACT

A five speed motorcycle transmission with coaxial input and output drives. The transmission includes a driveshaft and a countershaft rotatably mounted in a gear housing for supporting transmission system components and gear arrangements. Input torque is applied in a conventional manner to one end of the driveshaft and transmitted through the transmission components in the selected gear ratio to an output sprocket which is freely rotatably mounted on the drive shaft. Torque shifting means in the form of axially displaceable drive dogs splined to the driveshaft and countershaft can be shifted axially by conventional shifter means for selectively transmitting torque from the driveshaft through various gear arrangements to the output sprocket. The gear arrangements include a high speed overdrive gear arrangement, a high speed direct drive gear arrangement, and three low speed drive gear arrangements.

12 Claims, 8 Drawing Figures

FIVE SPEED MOTORCYCLE TRANSMISSION

BACKGROUND AND SUMMARY OF THE INVENTION

This invention relates to motorcycle transmissions and, more particularly, to a five speed motorcycle transmission with coaxial input and output drive means at one end of a common driveshaft means.

While five speed motorcycle transmissions have been heretofore developed, and are commercially available on motorcycles of some manufacturers, such as the Triumph Motorcycle Corporation, as far as I am aware, all prior five speed motorcycle transmissions have included only a direct drive and four lower gear ratio drives. In addition, the provision of conventional five speed motorcycle transmissions having axially spaced input and output drive means requires particular consideration of space limitations and arrangement of parts. Certain transmission arrangements, such as in motorcycles manufactured by the Harley-Davidson Motor Company, have not heretofore included a five speed transmission because of lack of available space and lack of a solution to more compact arrangement of parts.

The present invention provides a compact five speed transmission including a high speed overdrive gear arrangement, a high speed direct drive gear arrangement, and three low speed gear arrangements. In addition, conventional four speed transmissions, such as the four speed motorcycle transmission manufactured by the Harley-Davidson Motor Company for "Electra Glide-1200" and "Super Glide-1200" Harley-Davidson motorcycles, can be easily replaced by the present transmission.

In general, a conventional Harley-Davidson four speed transmission includes a gear housing which is approximately 7¾ inches long, 7 inches wide, and 5 inches deep. A main drive shaft is rotatably mounted in the housing in parallel spaced relationship to a non-rotatable countershaft fixedly mounted in the housing. A first group of four gears are mounted on the rotatable main drive shaft in engagement with a second group of four gears mounted on the countershaft. Two drive dogs are utilized to transmit input torque through various gear combinations and to the output providing the four gear speed ratios.

In general, the present invention involves the following major changes and modifications to the conventional four speed Harley-Davidson transmission:

1. Lengthening the gear housing by ⅜ inches.
2. Adding bearing mounts and bearings to the housing for rotatably mounting the countershaft.
3. Replacing the countershaft and driveshaft with shafts that are ⅝ inches longer.
4. Providing different gear arrangements and mountings which include adding an overdrive gear cluster, separating all of the countershaft mounted gears, and decreasing the overall width of the gears by ⅜ inches.
5. Adding an extra drive dog for the overdrive gear cluster.
6. Eliminating the speedometer drive gear.

In addition, the conventional shifter mechanism utilized on Harley-Davidson four speed transmissions can be easily replaced to accomodate the five speed transmission of the present invention. The Harley-Davidson shifter generally comprises: a single shifter shaft mounted above and between the driveshaft and countershaft for mounting axially displaceable shifter forks which are used to position the drive dogs for engaging various combinations of gears; a tumbler-like cam plate shifter having grooved cam tracks for guiding cam followers on the shifter forks for positioning the shifter forks; and a rachet type shifter gear for rotating the cam plate.

In general, this conventional Harley-Davidson shifter mechanism can be replaced to accomodate the transmission of the present invention by making the following changes and modifications:

1. Providing a longer shifter shaft with an additional shifter fork.
2. Providing a longer cam plate with an extra cam track.
3. Increasing the number of teeth on the shifter gear.
4. Increasing the size of the shifter casting.

More specifically, the transmission of the present invention comprises: gear housing means for enclosing transmission system components; driveshaft means rotatably mounted in the housing; countershaft means rotatably mounted in the housing parallel to and radially spaced from the driveshaft; input drive means operably connected to one end of the driveshaft means for transferring input torque from the motor to the driveshaft means; output drive means freely rotatably mounted on the driveshaft means for transferring torque from the transmission to an output such as the rear wheel of a motorcycle; torque shifting and transmitting means rotatably locked to but axially displaceable on the driveshaft means and on the countershaft means for selectively transmitting torque between transmission components; a first group of gears mounted on the driveshaft means in continuous engagement with a second group of gears mounted on the countershaft means, with the gears arranged and mounted such that the torque shifting and transmitting means can selectively engage various combinations of gears to transmit torque from the driveshaft means to the countershaft means to the output drive means, in four different gear ratios and directly from the driveshaft means to the output drive means in a one to one gear ratio.

DETAILED DESCRIPTION

In General

Figure 1:
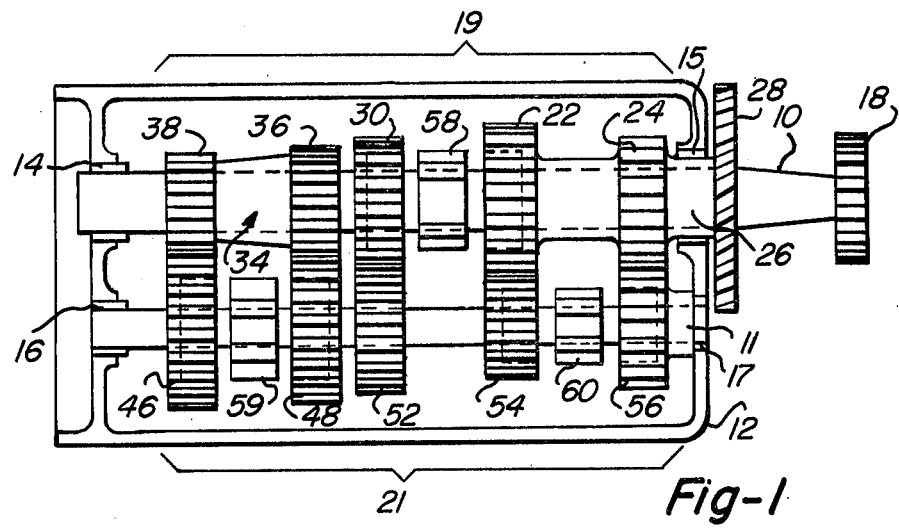
FIG. 1 is a schematic plan view partly cut away of the transmission in a neutral position.

Referring now to FIG. 1, in general, the new and improved transmission apparatus comprises: rotatable input shaft means 10, in the form of an elongated one piece driveshaft member, for transmitting input torque through the transmission; rotatable countershaft means 11, in the form of an elongated one piece countershaft member for rotatably supporting transmission components; gear housing means 12, in the form of a gear box assembly for enclosing the transmission components; bearing means 14, 15, 16, 17 for rotatably mounting the shaft means 10, 11 in the housing means; a conventional input drive means 18 mounted on one end of driveshaft member 10 for providing input torque from a motor to the driveshaft member in a conventional manner; a set of drive shaft gear members 19 mounted on driveshaft member 10; and a set of countershaft gear members 21 mounted on countershaft member 11.

Gear Arrangements

Output drive means in the form of a chain sprocket 28 is freely rotatably mounted on the driveshaft 10 adjacent the input drive means 18 and outside of the gear box enclosure 12. The chain sprocket 28 is operably connected to the rear wheel of the motorcycle for transmitting the output torque of the transmission to the rear wheel.

A driveshaft overdrive gear member 24 is freely rotatably mounted on driveshaft 10 and rigidly attached by hub 26 to the output chain sprocket 28.

A drive gear 22 is freely rotatably mounted on driveshaft 10 and rigidly attached by hub 26 to overdrive gear 24 and chain sprocket 28. Hub 26 which connects gears 22 and 24 to sprocket 28 may be journaled to shaft 10 by means such as bushings or roller bearings, so that gears 22 and 24 and sprocket 28 may turn freely on shaft 10, independent of the rotation of shaft 10. In addition, conventional retaining means such as lock nuts and shaft shoulders can be used to axially retain the hub 26 on the shaft, and prevent axial movement of gears 22 and 24 and sprocket 28.

A driveshaft third gear member 30 is freely rotatably mounted but axially retained on driveshaft 10 next adjacent and axially spaced from drive gear 22. Driveshaft third gear member 30 may be journalled to shaft 10 by conventional means such as bushings or roller bearings for independent rotation on driveshaft 10, and may be axially retained on driveshaft 10 by conventional means such as retaining rings.

A low and second gear cluster 34 comprising a driveshaft second gear member 36 and a driveshaft low gear member 38 is mounted in fixed axial relationship on and rotatably drivably connected to the driveshaft 10 next adjacent and axially spaced from driveshaft third gear 30. Gear cluster 34 may be drivably mounted on driveshaft 10 by conventional means such as splines or keys.

A countershaft low gear member 46 is freely rotatably mounted on countershaft 11 in a fixed axial relationship for constant meshing engagement with driveshaft low gear member 38. Gear member 46 may be conventionally journalled and axially retained on countershaft 11.

A countershaft second gear member 48 is freely rotatably mounted on countershaft 11 in a fixed axial relationship for constant meshing engagement with driveshaft second gear member 36. Countershaft second gear member 48 may be conventionally journalled and axially retained on countershaft 11 next adjacent and axially spaced from countershaft low gear member 46.

A countershaft third gear member 52 is mounted in fixed axial relationship on and rotatably drivably connected to countershaft 11 next adjacent and axially spaced from countershaft second gear 48. Third gear member 52 is fixedly mounted for constant meshing engagement with driveshaft third gear member 30 and may be conventionally fixed to countershaft 11 by splines or keys, or by other suitable means.

A drive transfer gear 54 is freely rotatably mounted on countershaft 11 in a fixed axial relationship, for constant meshing engagement with drive gear 22. Transfer gear 54 may be conventionally journalled and axially retained on countershaft 11 next adjacent and axially spaced from countershaft third gear member 52.

A countershaft overdrive gear 56 is freely rotatably mounted on countershaft 11 in a fixed axial relationship, for constant meshing engagement with overdrive gear 24. Countershaft overdrive gear 56 may be conventionally journalled and axially retained on countershaft 11 next adjacent and axially spaced from transfer gear 54.

The gear arrangements are sized to produce approximate gear ratios of 33 in first speed, 55 in second speed, 80 in third speed, 100 in fourth speed and 121 in fifth speed.

Torque Shifting and Transmitting Means

Torque shifting and transmitting means in the form of drive dogs 58, 59 and 60 are rotatably driveably mounted on driveshaft 10 and countershaft 11 while being freely axially moveable between adjacently mounted gears.

Figure 7:
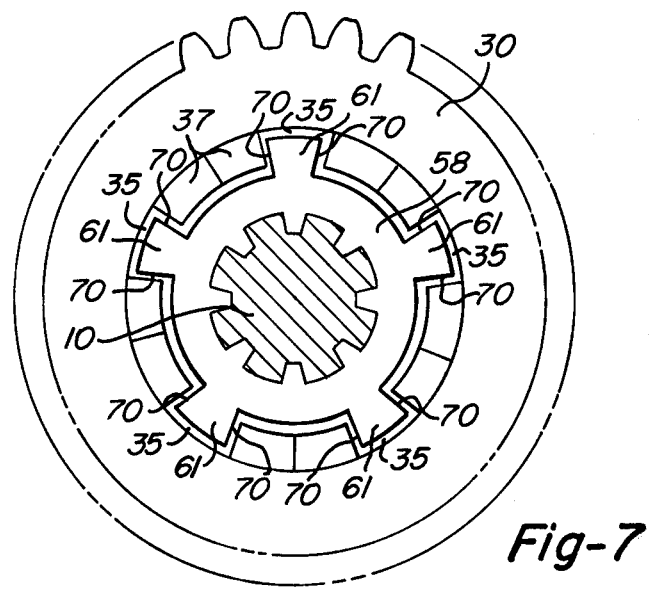
FIG. 7 is an enlarged cross-sectional view showing details of a torque shifting and transmitting means of the invention.
Figure 8:
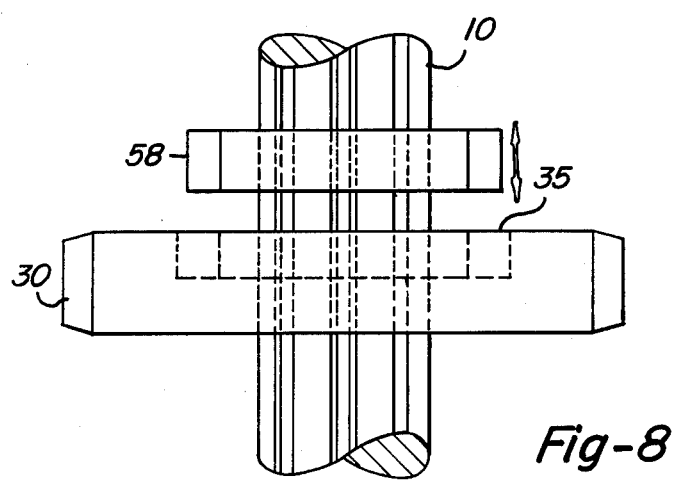
FIG. 8 is a side elevation view of the torque shifting and transmitting means of FIG. 7.

FIGS. 7 and 8 show drive dog 58 which is splined to driveshaft 10 in position between gears 22 and 30. Drive dog 58 has a generally circular peripheral shape and includes an array of circumferentially arranged radially outwardly extending drive lugs 61, formed with flat radially extending abutment surfaces 70 having relatively sharp radially extending side edges. The drive dog 58 can be held in a neutral position between gears 30, 22 or may be shifted axially in either direction so that drive lugs 61 mate with matching lug recesses 35 that are machined on the face of adjacent gear 30 or 22. In the shifted axial positions with the drive lugs 61 engaging the surfaces of recesses 35, torque is transmitted from driveshaft 10 to drive dog 32 to the engaged gear 30 or 22. The outer surfaces 37 between gear recesses 35 may be chamfered so that drive lugs 61 will slide easily into the recesses 35. The remaining portion of the recess may be formed with flat transverse surfaces so that the abutment surfaces 70 of the drive lugs 61 positively engage the flat transverse surfaces of the recesses 35 with no slippage between the two components during torque transmission. A second drive dog 59, FIG. 1, is splined to countershaft 11, in the same manner as drive dog 58, between gears 46 and 48, and may be shifted to a neutral position between the gears, or may be shifted to engage either gear 46 or gear 48, thus transmitting torque through the engaged gear to countershaft 11. A third drive dog 60 is also splined to countershaft 11, between gears 54 and 56, and may be shifted to a neutral position between the gears, or may be shifted to engage either of the gears.

Conventional shifter mechanisms and shifter forks (not shown) can be utilized to axially shift the drive dogs 58, 59, 60 or hold them in the desired position. One such suitable shifter mechanism is utilized on the motorcycles manufactured by the Harley Davidson Motor Company and is illustrated on pages 164–169 of the 1974 Service Manual for "Electra Glide-1200" and "Super Glide-1200" Harley-Davidson motorcycles. To modify the conventional Harley-Davidson shifter to accommodate the present transmission, the modifications previously cited may be made.

Operation

The neutral position is shown in FIG. 1. In neutral all of the drive dogs are in the neutral position between gears and no torque is transmitted to output sprocket 28.

Figure 2:
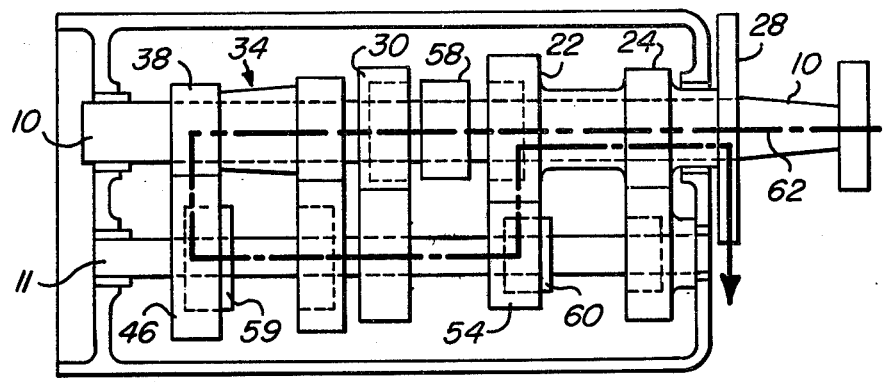
FIG. 2 is a schematic plan view partly cut away of the transmission in the first gear position.

FIG. 2 shows the transmission in first or low gear. In low gear drive dog 59 is shifted to engage countershaft low gear 46 and drive dog 60 is shifted to engage transfer gear 54. Drive dog 58 is in a neutral position between gears 22 and 30. Input torque applied to the driveshaft 10 causes rotation of driveshaft low gear member 38 which in turn causes rotation of countershaft low gear member 46, engaged drive dog 59 and thus countershaft 11. Rotation of the countershaft 11 causes rotation of drive dog 60 and thus engaged transfer gear 54, along with drive gear 22 and output sprocket 28. Thus, torque is transmitted from the motor to driveshaft 10 through driveshaft low gear 38, countershaft low gear 46, countershaft 11, transfer gear 54, and to drive gear 22 and output sprocket 28. Broken line 62 illustrates the torque path in first gear. The gears may be sized so that output sprocket 28 rotates at a low speed gear ratio of, for example 33.4.

Figure 3:
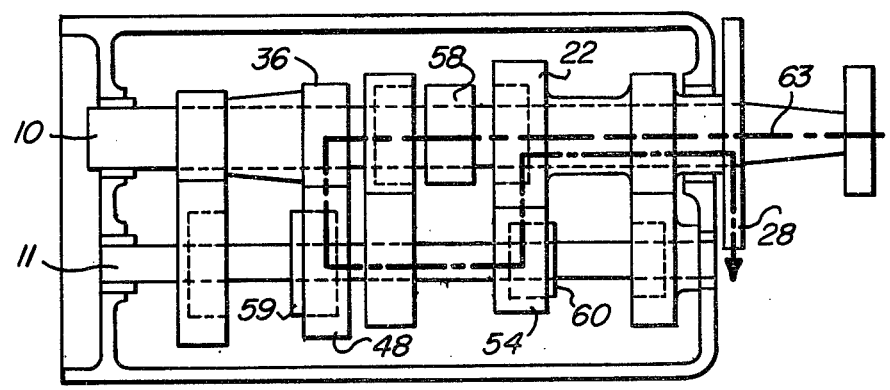
FIG. 3 is a schematic plan view partly cut away of the transmission in the second gear position.

Second gear is shown in FIG. 3. In second gear, drive dog 58 is in a neutral position, drive dog 59 is in engagement with countershaft second gear 48 and, drive dog 60 is in engagement with transfer gear 54. Rotation of driveshaft 10 causes rotation of driveshaft second gear 36 which rotates countershaft second gear 48, engaged drive dog 59 and countershaft 11. Rotation of countershaft 11 causes transfer gear 54, drive gear 22 and output sprocket 28 to rotate. Broken line 63 illustrates the torque path in second gear. The gears may be sized so that output sprocket 28 rotates at a second gear ratio of, for example 55.2.

Figure 4:
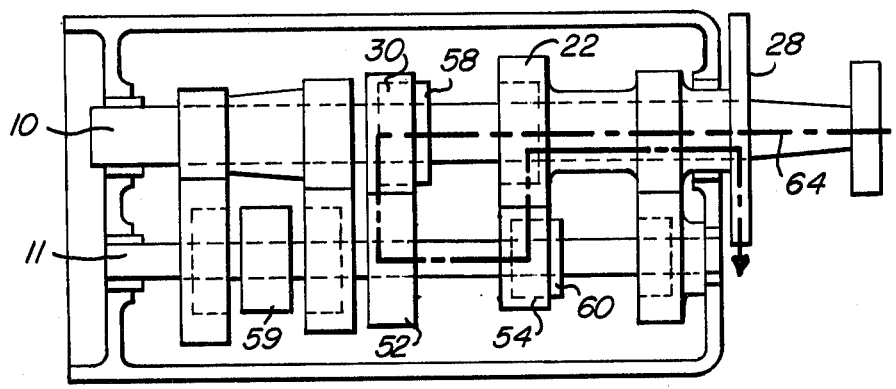
FIG. 4 is a schematic plan view partly cut away of the transmission in the third gear position.

Third gear is shown in FIG. 4. In third gear drive dog 59 is in the neutral position, drive dog 58 is in engagement with driveshaft third gear 30 and drive dog 60 is in engagement with transfer gear 54. Rotation of driveshaft 10 causes rotation of drive dog 58 and thus engaged driveshaft gear 30. Rotation of driveshaft third gear 30 causes rotatably fixed countershaft third gear 52 to rotate along with the countershaft drive dog 60, transfer gear 54, drive gear 22 and output sprocket 28. Broken line 64 illustrates the torque path in third gear. The gears may be sized so that output sprocket 28 rotates at a third gear ratio of 80.14.

Figure 5:
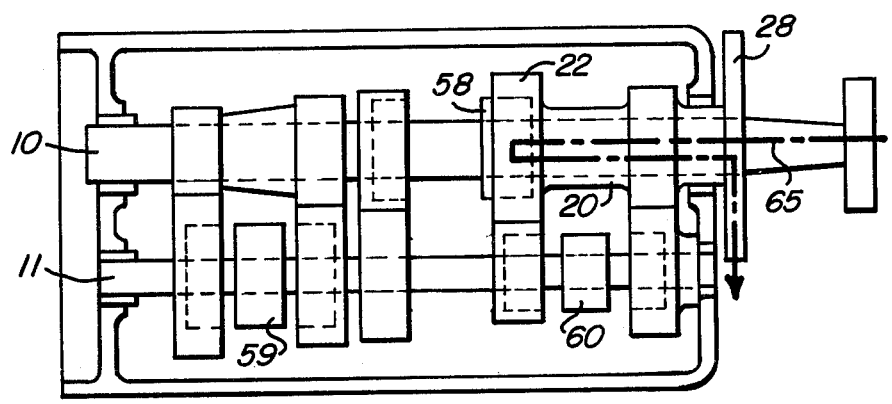
FIG. 5 is a schematic plan view partly cut away of the transmission in the fourth gear position.

Fourth, direct drive, gear is shown in FIG. 5. In fourth gear drive dogs 59 and 60 are in their neutral position and drive dog 58 is in engagement with drive gear 22. Rotation of driveshaft 10 causes drive dog 58, engaged drive gear 22 and output sprocket 28 to rotate in a gear ratio of 100. Broken line 65 shows the torque path in fourth gear.

Figure 6:
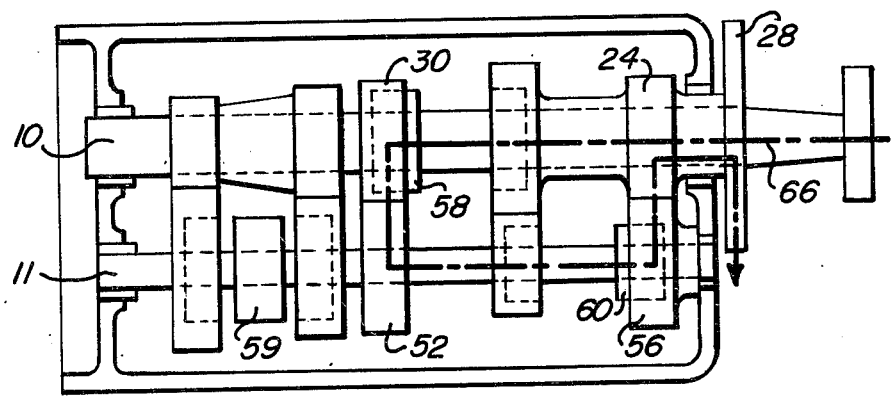
FIG. 6 is a schematic plan view partly cut away of the transmission in the overdrive position.

Overdrive gear is shown in FIG. 6. In overdrive, drive dog 59 is in the neutral position, drive dog 58 is in engagement with driveshaft third gear 30, and drive dog 60 is in engagement with countershaft overdrive gear 56. Rotation of driveshaft 10 causes rotation of drive dog 58 along with engaged third gear 30, countershaft third gear 52, countershaft 11, drive dog 60, countershaft overdrive gear 56, driveshaft overdrive gear 24 and output sprocket 28. Broken line 66 shows the torque path in overdrive gear. The gears may be sized so that output sprocket 28 rotates at an overdrive gear ratio of, for example 121.

A conventional Harley-Davidson four speed transmission may be modified to the present five speed configuration by lengthening the gear housing by ⅝", adding bearings 16 and 17 for rotatably mounting the countershaft 11, adding a different countershaft 11 and driveshaft 10 which are ⅝ inches longer, adding drive dog 60 and overdrive gears 24 and 56, separating transfer gear 54 from countershaft third gear 52, decreasing the overall width of the gears by ⅝ inches, and eliminating the speedometer drive gear.

Thus, the invention provides a compact transmission with coaxial input and output drives, three low speed gear arrangements, a fourth speed direct drive gear arrangement, an overdrive gear arrangement and requires a minimum of additional space over conventional four speed transmissions.

While the inventive concepts have been described hereinbefore in an illustrative embodiment thereof, for a motorcycle transmission, it is contemplated that the inventive concepts may be adapted, changed, and modified for use on apparatus other than motorcycles, and it is intended that the appended claims be construed to cover any such adaptations, changes, and modifications except as limited by the prior art.

What is claimed is:

1. A motorcycle transmission system for connecting a cycle motor to a drive chain extending rearwardly to and operably connected to a rear wheel of the motorcycle, and comprising:

a housing having a chamber defined by a bottom wall, a pair of spaced parallel side walls extending transversely relative to the drive chain and a pair of end walls extending parallel relative to the drive chain;

a one piece continuous drive shaft mounted in said chamber adjacent to and extending parallel with one of said side walls with one end rotatably mounted in one of said end walls and the other end rotatably mounted in the other one of said end walls and having an end portion extending outwardly from said chamber beyond the other one of said end walls;

a one piece continuous countershaft mounted in said chamber in spaced parallel relationship to said main drive shaft and located adjacent the other one of said side walls with one end rotatably mounted in one of said end walls and the other end rotatably mounted in the other of said end walls;

transmission gear members mounted on said main drive shaft and said countershaft for selective engagement and providing a direct gear drive ratio, four lower gear drive ratios, and an overdrive gear ratio;

an elongated drive hub rotatably coaxially mounted on said main drive shaft next adjacent said end portion and extending through said other one of said end walls and including an inner portion within said chamber and an outer portion on said end portion of said main drive shaft;

a motor driven input gear mounted on said end portion of said main drive shaft beyond said outer portion of said drive hub;

an output chain sprocket mounted on said outer portion of said drive hub for rotation therewith relative to said main drive shaft and being located next adjacent said other one of said end walls;

a main drive gear drivably mounted on said inner portion of said drive hub;

a first overdrive gear drivably mounted on said inner portion of said drive hub and being located next adjacent said other one of said end walls;

a second overdrive gear mounted on said countershaft next adjacent said other one of said end walls in constant meshing engagement with said first overdrive gear; and shift means operatively associated with said transmission gear members for enabling selection of the various gear drive ratios including selection of the overdrive gear ratio without axial displacement of any of said drive hubs, said main drive gear, said first overdrive gear and said second overdrive gear.

2. The invention as defined in claim 1 and wherein said housing is approximately 7¾ inches long, 7 inches wide, and 5 inches deep or less.

3. The invention as defined in claim 1 and wherein the gear arrangements, comprise:

a low gear arrangement comprising a driveshaft low gear rotatably locked to the driveshaft, and, a countershaft low gear freely rotatably mounted on the countershaft in continuous meshing engagement with the driveshaft low gear;

a second gear arrangement comprising a driveshaft second gear rotatably locked to the driveshaft, and, a countershaft second gear freely rotatably mounted on the countershaft in continuous meshing engagement with the driveshaft second gear;

a third gear arrangement comprising a driveshaft third gear freely rotatably mounted on the driveshaft, and, a countershaft third gear rotatably locked to the countershaft in continuous meshing engagement with the driveshaft third gear;

a drive and fourth gear arrangement comprising a drive gear freely rotatably mounted on the driveshaft and rigidly connected to the output drive means and a transfer gear freely rotatably mounted on the countershaft in continuous meshing engagement with the drive gear; and an overdrive arrangement comprising a driveshaft overdrive gear freely rotatably mounted on the driveshaft and rigidly connected to the output drive means;

and, a countershaft overdrive gear freely rotatably mounted on the countershaft in continuous meshing engagement with the driveshaft overdrive gear.

4. The invention as defined in claim 3 and wherein the driveshaft low gear and the driveshaft second gear are rigidly connected to each other for simultaneous rotation with the driveshaft.

5. The invention as defined in claim 4 and wherein the input drive means and output means are located outside of the gear housing and the gear arrangements are located inside the gear housing axially spaced from the output means in the order of overdrive, drive, third, second and first gears.

6. The invention as defined in claim 5 and wherein the shift means comprises:

a first drive dog locked to the driveshaft but axially displaceable between the drive gear and the driveshaft third gear and formed for selective engagement with the driveshaft third and driveshaft drive gear for transmitting torque from the driveshaft to the egaged gear;

a second drive dog splined to the countershaft and axially displaceable between the countershaft low gear and the countershaft second gear and formed for selective engagement with the countershaft low and second gear for transmitting torque from the engaged gear to the countershaft; and a third drive dog splined to the countershaft and axially displaceable between the countershaft transfer gear and the countershaft overdrive gear and formed for selective engagement with the countershaft transfer and countershaft overdrive gear for transmitting torque from the engaged gear to the countershaft.

7. The invention as defined in claim 6 and wherein:

the drive dogs are formed with circumferentially arranged radially outwardly extending drive lugs for engaging corresponding recesses in an engaged gear for transmitting torque between the drive dog and the engaged gear.

8. A transmission system for transmitting power from a motor to an output in a motorcycle, comprising:

a gear housing for enclosing transmission system components;

a driveshaft mounted for rotation in the gear housing;

a countershaft mounted for rotation in the gear housing parallel to and radially spaced from the driveshaft;

input drive means affixed to one end of the driveshaft for transmitting torque from the motor to the driveshaft;

an output sprocket freely rotatably mounted on one end of the driveshaft coaxial with the input drive means for transmitting torque from the transmission to the output;

an overdrive gear arrangement axially spaced from and adjacent to the output sprocket comprising a driveshaft overdrive gear freely rotatably mounted to the driveshaft and rigidly connected to the output sprocket and in continuous meshing engagement with a countershaft overdrive gear freely rotatably mounted to the countershaft;

a fourth gear arrangement axially spaced from and adjacent to the overdrive gear arrangement comprising a drive gear freely rotatably mounted on the driveshaft and rigidly connected to the driveshaft overdrive gear and in continuous meshing engagement with a countershaft transfer gear freely rotatably mounted to the countershaft;

a third gear arrangement axially spaced from and adjacent to the fourth gear arrangement and comprising a driveshaft third gear freely rotatably mounted on the driveshaft and in continuous meshing engagement with a countershaft third gear rotatably drivably connected to the countershaft;

a second gear arrangement axially spaced from and adjacent to the third gear arrangement and comprising a driveshaft second gear rotatably drivably connected to the driveshaft and in continuous meshing engagement with a countershaft second gear freely rotatably mounted on the countershaft;

a first gear arrangement axially spaced from and adjacent to the second gear arrangement and comprising a driveshaft first gear rotatably drivably connected to the driveshaft and in continuous meshing engagement with a countershaft first gear freely rotatably mounted to the countershaft; and torque shifting and transmitting means for selectively engaging various gear arrangements to transmit torque from the driveshaft to the countershaft to the output sprocket in three different low speed gear ratios and a fifth speed overdrive ratio, and directly from the driveshaft to the output sprocket in a fourth speed.

9. The invention as defined in claim 8 and wherein the torque shifting and transmitting means, comprises:
- an axially displaceable first drive dog splined to the driveshaft between the third gear and fourth gear arrangements and formed to engage the fourth gear arrangement and third gear arrangement for transmitting torque from the driveshaft to the third gear or fourth gear arrangement;
- a second axially displaceable drive dog splined to the countershaft between the first gear and second gear arrangement and formed to engage the first gear and the second gear arrangement for transmitting torque between the countershaft and the first or second gear arrangement; and
- a third axially displaceable drive dog splined to the countershaft between the fourth gear arrangement and the overdrive arrangement and formed to engage the fourth gear arrangement and the overdrive arrangement for transmitting torque between the countershaft and the overdrive or fourth gear arrangement.

10. The invention as defined in claim 9 and wherein the drive dogs are formed with circumferentially arranged radially outwardly extending drive lugs for engaging corresponding recesses in an engaged gear for transmitting torque between the drive dog and the engaged gear.

11. The invention as defined in claim 8 and wherein the gear arrangements are sized to produce the following approximate gear ratios:
- first speed—33
- second speed—55
- third speed—80
- fourth speed—100
- fifth speed—121

12. The invention as defined in claim 8 and wherein the driveshaft first gear and second gear are rigidly affixed to each other.

* * * * *